March 11, 1958     G. J. REER     2,826,044
ALARM MECHANISM FOR REFRIGERATION SYSTEMS
Original Filed March 4, 1953     4 Sheets-Sheet 1

INVENTOR.
Guy J. Reer.
BY
Searmant Searman.
ATTORNEYS

March 11, 1958 G. J. REER 2,826,044
ALARM MECHANISM FOR REFRIGERATION SYSTEMS
Original Filed March 4, 1953 4 Sheets-Sheet 2

INVENTOR.
Guy J. Reer
BY
Learman & Learman
ATTORNEYS

March 11, 1958 G. J. REER 2,826,044
ALARM MECHANISM FOR REFRIGERATION SYSTEMS
Original Filed March 4, 1953 4 Sheets-Sheet 3

INVENTOR.
Guy J. Reer.
BY
Fearman & Fearman.
ATTORNEYS

March 11, 1958         G. J. REER         2,826,044

ALARM MECHANISM FOR REFRIGERATION SYSTEMS

Original Filed March 4, 1953         4 Sheets-Sheet 4

INVENTOR.
GUY J. REER
BY

ATTORNEYS

United States Patent Office 2,826,044
Patented Mar. 11, 1958

2,826,044

ALARM MECHANISM FOR REFRIGERATION SYSTEMS

Guy J. Reer, Saginaw, Mich.

Continuation of application Serial No. 340,189, March 4, 1953. This application February 8, 1956, Serial No. 564,280

23 Claims. (Cl. 62—4)

This invention relates to refrigeration systems and more particularly to a multi-purpose alarm mechanism therefor which is energized when the supply of refrigerant is too low, as where a leak has developed in the system, and is also energized when the system is rendered incapable of proper operation for a multitude of other reasons.

As is well-known, a leak in a refrigeration system will in most cases remain undetected until such time as the supply of refrigerant is almost exhausted and the temperature in the space to be cooled has noticeably risen. In refrigeration rooms where meats and other foods are to be cooled, a considerable portion of the food is very often spoiled before the owner of the establishment is aware that his supply of refrigerant has depleted beyond the point at which it can no longer satisfactorily cool the room. Such a loss can be very costly, particularly where large quantities of food must be cooled to prevent spoilage thereof, and further, of course, is magnified by the loss of the refrigerant itself which is quite expensive and must be replaced. Heretofore, leak controls have been proposed which shut off a refrigeration system to prevent the further loss of refrigerant when a leak occurs, but obviously such alarms are not satisfactory where perishable foods must be continuously maintained at low temperatures.

One of the prime objects of my invention is to design an alarm mechanism for a refrigeration system which indicates by either a visible and/or audible signal that there is a leak of refrigerant in the system which must be quickly repaired and thereby prevents the costly spoilage of food and waste of refrigerant.

A further object of the invention is to design an alarm mechanism which indicates that there is a leak of refrigerant in the system almost immediately, and does not depend for its actuation on pressure differentials in the line which would not occur until the entire supply of refrigerant was virtually depleted.

Another object of the invention is to design an alarm mechanism of the type described which indicates to the layman before the system completely breaks down that the system needs repair, thus enabling him to call in a repair technician or specialist. Normally, he would be unaware of the need for repair until after most of the refrigerant had escaped.

Obviously, the refrigeration system will fail for reasons other than the development of a leak in the refrigerant lines, and a further object of the invention is therefore to provide an all-purpose alarm mechanism which indicates when there has been a power failure or when a fuse or a thermal relay has interrupted the power supply; when the motor or the compressor has been damaged and rendered inoperative, or partially so, and must be repaired; when the pressure or thermostatic switch for intermittently energizing the motor is inoperative or out of adjustment; when the filter or dryer in the liquid line has become clogged or restricted; and when the thermostatic expansion valve has been damaged and rendered inoperative.

Another object of the invention is to provide a multiple alarm mechanism in which one of the alarms is constantly energized and another alarm is energized only under certain abnormal conditions; thus when the former alarm is not energized, certain faulty conditions are indicated, and when the latter alarm is energized, certain other faulty conditions are indicated.

A further object of the invention is to design an alarm mechanism of the type described which is economical to manufacture and install and which can be readily installed in existing refrigeration systems without the need of extensive changes or improvisations and with a minimum of time and effort.

A still further object of the invention is to design an alarm system of the type described which is highly reliable in use, is positive in operation, and which permits a rigid control of the pressures in the suction and liquid lines.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

This application is a continuation of application Serial No. 340,189 filed March 4, 1953, now abandoned, for an Alarm Mechanism for Refrigeration Systems.

Figure 1:
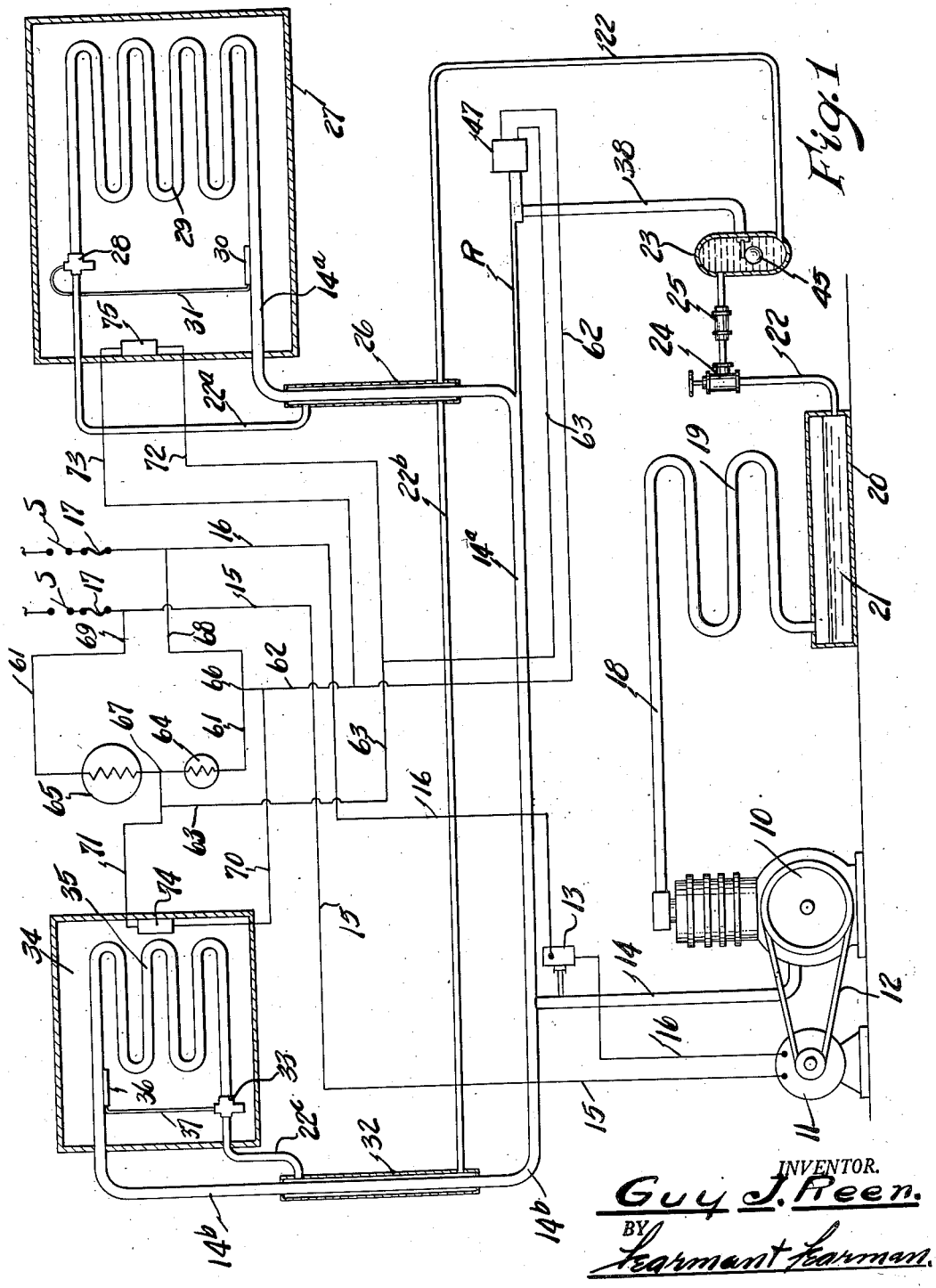
Fig. 1 is a diagrammatic or schematic view of a refrigeration system incorporating my alarm mechanism.
Figure 3:
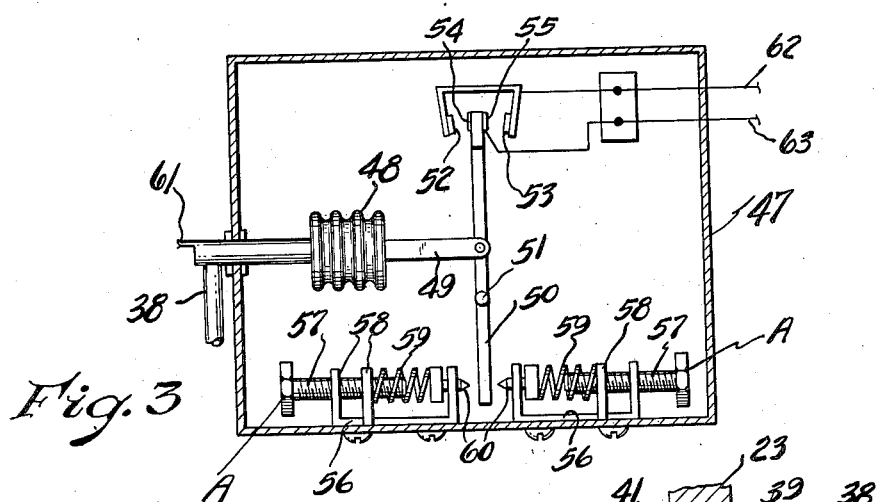
Fig. 3 is a side elevational, sectional view of the pressure responsive switch which is in communication with the float chamber.

Referring now to the accompanying drawings and more particularly to Fig. 1 therof, the refrigeration system depicted includes a compressor 10 which is driven by a motor 11 through the medium of a belt 12 as usual, the motor 11 being intermittently energized by a suitable low pressure switch or control 13 which is responsive to pressure variations in the suction line or conduit 14 to make and break the motor power circuit comprised of the wire conductors 15 and 16 in the conventional manner. Clearly, a thermostatic control could be used in place of the switch 13 if desired, and a high pressure cut-off piped to the high side of the system could be used in conjunction with either, but for convenience I have simply shown the low pressure switch 13 connected in the circuit wire 16 and it will be apparent to persons skilled in the art that when the pressure in the suction line increases a given amount, the motor 11 will be energized to drive the compressor 10. Fuses 17 are provided in the conductors 15 and 16 in the usual manner and power supply switches S can be opened at any time to disconnect the power supply and permit the repair of the system.

A high pressure conduit 18 leads from the discharge side of the compressor 10 to an air-cooled condenser 19 and thence to the closed receiver 20 as usual. Sufficient refrigerant is provided at all times to completely fill the liquid line of the system during normal operation of the refrigerating apparatus and a reserve of refrigerant is provided in the receiver in the event of surging. This reserve is indicated at 21, the space above the liquid reserve in the receiver being occupied, of course, by gaseous or uncondensed refrigerant.

Interposed in the line 22 leading from the receiver 20, I have provided a float chamber 23 which might, of course, be termed an extension of the receiver 20, and it will be seen that the liquid line 22 leads from below the normal minimum level of the reserve 21 upwardly into the upper portion of the closed tank 23. A conventional stop valve 24 to shut off liquid flowing from the receiver 20 and permit the system to be cleaned or repaired is provided in the line 22 as shown, and a conventional filter or dryer 25 is provided there adjacent to remove moisture from the refrigerant. The hand operated valve 24 is, of course, normally in open position.

From the bottom of the float chamber 23, the liquid line 22 leads to a heat exchanger 26 where it is subcooled by the gases in the suction line 14a in the usual manner. From the heat exchanger 26, the liquid line 22 leads into the fixture housing 27 as at 22a to the thermostatic expansion valve 28 and thence to the evaporator coil 29, the suction line 14a leading the evaporated refrigerant back to the heat exchanger 26. The valve 28 is provided with a feeler bulb 30, and a capillary tube 31 connecting the bulb and valve as usual. For purposes of illustration, I have shown a pair of evaporation fixtures in the instant system and therefore the liquid line 22 branches off at the heat exhanger 26 as at 22b and leads to a second heat exchanger 32 and from there as at 22c to a second thermostatic expansion valve 33 in the other fixture housing 34 and to the evaporator coil 35 therein. The valve 33 is similarly provided with a feeler bulb 36 and a connecting capillary tube 37. Leading from the coil 35 to direct the refrigerant evaporated in the coil 35 back to the suction side of the compressor 10 is a suction line 14b which joins the suction line 14a coming from the heat exchanger 26 and leads to the main suction line 14 and compressor 10.

Figure 2:
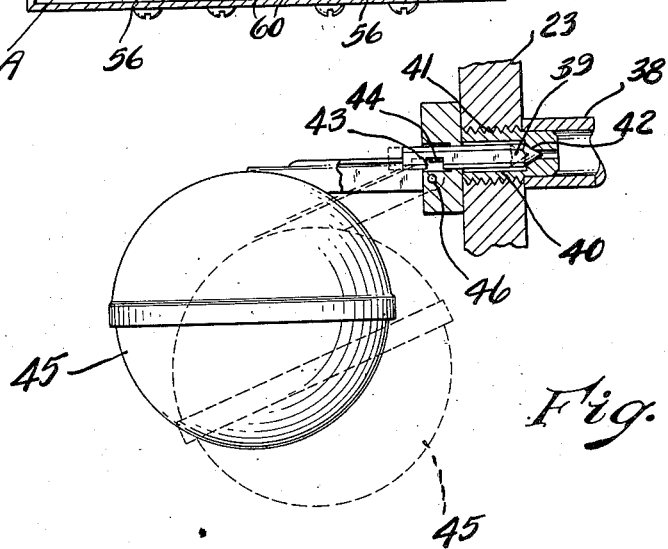
Fig. 2 is a sectional, side elevational view of the float mechanism associated therewith, the broken lines indicating the ball float swung down to open the valve in the float chamber.
Figure 4:
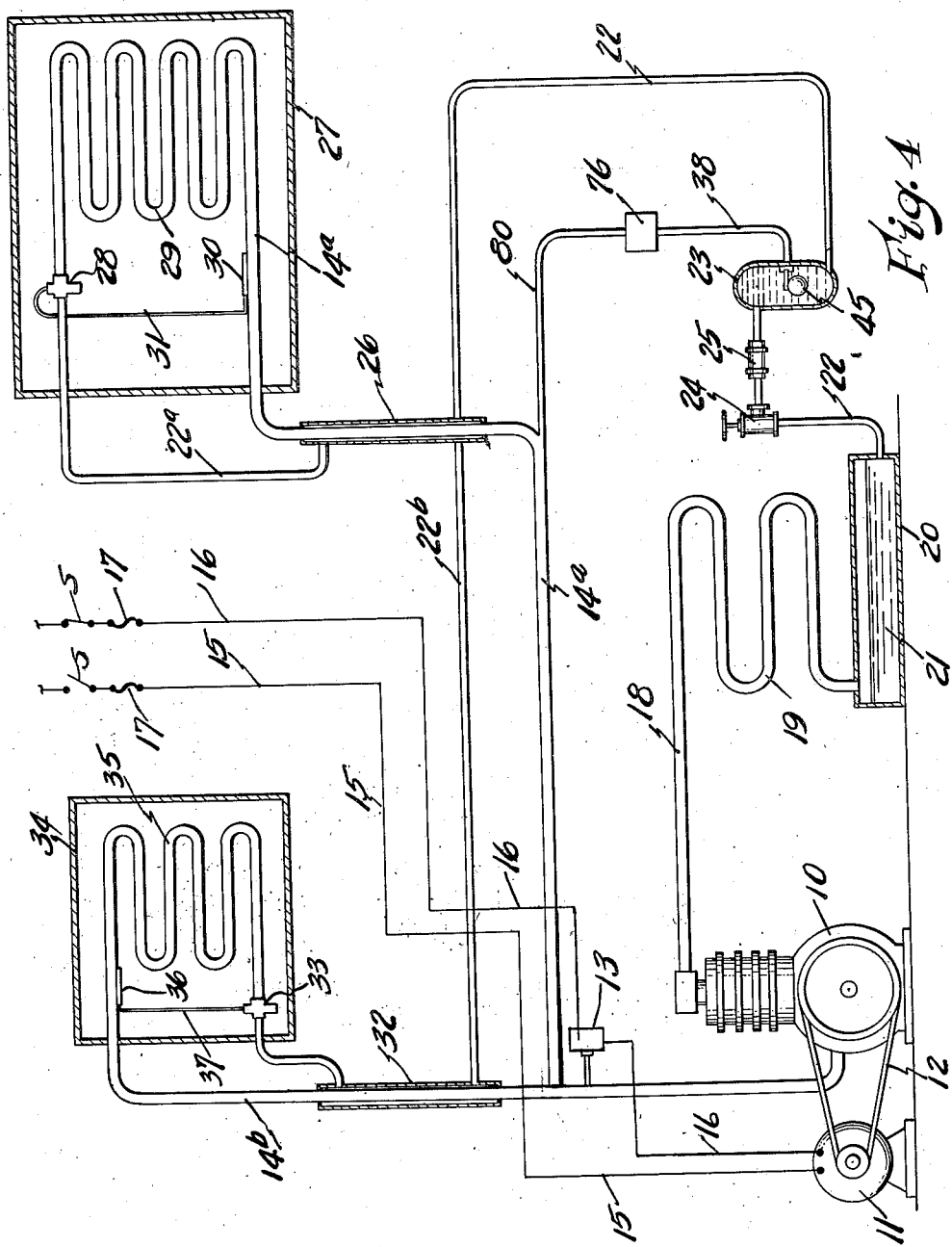
Fig. 4 is a schematic view of a modified embodiment of the invention wherein an audible alarm is employed.

Extending into the float chamber or receiver extension 23 is a tube 38 which is normally closed by means of a suitable valve such as a conventional float operated valve, for example, as disclosed in Figures 1, 2, and 4. The float operated valve is shown most clearly in Fig. 2 as including a valve needle of hexagonal cross section 39 slidably mounted in an opening 40 of circular cross section in a threaded plug 41, the plug 41 being threaded in the chamber wall adjacent the tube 38 which leads from the valve seat 42. The needle 39 which is notched as at 43 is mounted on the cross bar 44 of the float and is retracted when the float 45 which is pivotally mounted on the plug 41 as at 46 swings downwardly which, of course, would only happen when the liquid level in the float chamber was substantially reduced.

The float and valve mechanism described is, of course, not critical, any float which would open the valve upon a fall thereof and which is prevented from swinging upwardly, being suitable for the intended purpose. The tube 38 leads into a switch housing 47 wherein it is operatively associated with one end of a bellows 48, the opposite end of the bellows 48 having a rod 49 thereon for actuating an insulated lever switch 50 pivotally mounted as at 51 between a pair of terminals 52 and 53. Contacts 54 and 55 are mounted on the electrically conductive upper end of the lever 50. When there is a leak in the refrigerant lines and the float valve is open and high pressure gas from the emptied receiver 20 is proceeding up the tube 38, the bellows 48 expands, thus pivoting the switch 50 and associating the normally intermediately disposed switch 50 with the terminal 53.

Since it is desirable that the bellows 48 also expand or contract to indicate other faulty conditions, the pressures at which the bellows 48 will operate must be set with relation to the pressure limits set for the motor control switch 13 to operate. For example, the pressure control switch 13 may be set to cut the motor in when the pressure in the suction line reaches about 33 p. s. i. and to cut the motor off when the pressure drops to 15 p. s. i. dependent on the degree of cooling desired and the kind of refrigerant used. Preferably, in this instance, the bellows 48 should be actuated only by a pressure which is about two p. s. i. less than the pressure which will break the motor circuit or by a pressure which is about two p. s. i. greater than the pressure which cuts the motor in once again, but these limits can, of course, be varied as desired.

The limits at which the bellows 48 will be fully actuated are set by adjusting the spring-loaded adjusting screws A—A which are positioned on each side of the lever 50, the screws A including U-shaped brackets 56 with screws 57 extending through the outer legs thereof and through a threaded spring-loaded slide 58. Rigid on the slides 58 are coil springs 59 and points 60 are provided on the opposite inner ends of the springs 59, extending through the inner legs of the brackets 56 to engage the lever 50. Movement of the slides 58 inwardly or outwardly by turning the screws 57 increases or decreases respectively the load on the springs 59 and thus the force transferred by the bellows 48 necessary to pivot the lever 50 to engage the terminals 54 or 55.

A restrictor tube R leads from the tube 38 to the suction line 14a as shown, to provide a return path for the high pressure gas proceeding into the tube 38 which will continue to flow into the tube 38 and actuate the alarm mechanism until repairs are made. Inasmuch as the tube R is of considerable length and restricted diameter pressure will build up in the chamber adjacent the bellows 48 and will actuate the bellows immediately. Also, the tube R provides a communication line to the bellows 48 from the suction line 14a to enable the bellows to respond to abnormal pressure variations therein over or under the limits set. These abnormal pressure conditions would occur and operate to actuate the bellows upon a motor or compressor failure or when the motor control switch 13 was not properly operating, which conditions would, of course, not affect the float and valve mechanism. If the pressure in the suction line should rise above the predetermined limit whatever it may be, or falls below a predetermined minimum pressure, the bellows 48 expands or contracts respectively, thus pivoting the switch 50 to associate it with the terminals 52 or 53.

Obviously, if the system is operated within the required limits set for the bellows 48, no alarm is energized, but once the pressure rises above the predetermined maximum, or drops below the predetermined minimum, the alarm indicates that repair is necessary.

The terminals 52 and 53 and the contacts on the lever switch 50 are connected to the alarm circuit 61 by conductors 62 and 63 respectively. The alarm circuit includes high resistance or low wattage lamp 64 and a low resistance or high wattage lamp 65 connected in series, the wire 62 joining the circuit 61 at 66 on one side of the high resistance light 64 and the wire 63 joining the circuit at 67 on the opposite side of the lamp 64. The alarm circuit 61 is connected to the power supply wires by wires 68 and 69 and normally the high resistance or low wattage lamp 64 glows since it draws the current. When the circuit is made through the pressure energized circuit formed by the switch lever 50, the terminal 52 or 53, and the wires 62 and 63, which circuit by-passes the high resistance lamp 64, current is drawn by the low resistance lamp 65 to thus light it and indicate that repairs need be made. When, for example, there is a refrigerant leak in the system, the supply of liquid refrigerant in the receiver will drop below the normal minimum level thereof, that is, the tube 22 will be uncovered, thus permitting the high pressure uncondensed gas within the receiver 20 above the liquid line to proceed into the float chamber 23 to displace the float 45 and thence proceed up the tube 38 to actuate the bellows 48 so that the switch 50 is swung to engage the terminal 53, thereby lighting the low resistance lamp 65. As is apparent from the relative sizes of the chambers 20 and 23 the alarm will be energized before the supply of liquid in the chamber 20 is completely depleted upon a predetermined drop in the level in chamber 20. This action would occur long before the pressures in the lines indicated the need for repair since the compressor would work continuously to maintain the pressures within the limits set for the operation of the control 13. Only when the refrigerant supply was virtually depleted would the pressures in the lines vary sufficiently to back up into the restrictor tube R and energize the pressure responsive and alarm circuits.

Since leaks are generally small at first and build up over a considerable period of time, my alarm mechanism is energized immediately upon leakage of an amount of refrigerant roughly equal to the amount provided in the receiver in case of surging which is but a small fraction of the total refrigerant in the system. The owner of the refrigeration system has then ample time to call in a technician to repair the leak before temperatures in the fixtures would rise sufficiently to spoil perishable foods. The lamp 65 will also light when either of the thermostatic expansion valves are inoperative, since circuits 70—71 and 72—73 leading to thermostats 74 and 75 in the fixtures are connected in parallel to the wires 62 and 63 of the pressure responsive circuit. Thus, when either expansion valve 33 or 28 is not admitting sufficient refrigerant to the respective evaporator and the temperature in the space to be cooled rises, the thermostats 74 or 75 will close the circuits 70—71 or 72—73 respectively.

Obviously, also, the lamp 65 will light if the filter or dryer 25 becomes restricted, thereby preventing the satisfactory flow of liquid from the receiver 20 and permitting the high pressure gas to actuate the bellows 48.

When the compressor 10 or motor 11 are rendered inoperative and need repair, pressure will build up in the suction lines 14 and 14a and back up into the restrictor tube R, also expanding the bellows 48 to light the lamp 65.

An abnormally low pressure in the suction line caused by the failure of the motor control switch 13 to properly cut off the motor or by a safety relief device (not shown) in the high pressure line 18 blowing, would light the lamp 65 by contracting the bellows 48. The lamp 64 which normally glows will, of course, be de-energized by a power failure or when one of the fuses 17 blows, thus instantly pinpointing this particular trouble. When a motor starter (not shown) is employed in the motor circuit with larger size motors, the lines 68 and 69 lead from the motor starter so that failure of one of the thermal relays in the starter would de-energize the lamp 64.

It may be desirable to substitute a simple low resistance alarm bell (not shown) for the lamp 65 or to use one wired in parallel therewith to provide an audible alarm. Such a bell would preferably be of a type which had a switch thereon to manually break the bell circuit.

In Fig. 4 I have shown a second embodiment of my invention in which an audible alarm is employed to indicate a leak of refrigerant in the refrigeration system. Instead of leading to a pressure responsive bellows and a switch mechanism connected to a lamp alarm system, the tube 38 leads to a housing 76 (see Fig. 5), in which a reed 77 substantially bridges a pair of intermediate plates 78 and 79 and is affixed to one of them as shown. When there is a leak in the refrigerant system and the liquid reserve 21 in the receiver 20 is lost, thus permitting uncondensed refrigerant under a high pressure to enter the float chamber 23 and displace the float 45 to open the valve 39 and thence proceed up the tube into the housing 76, the reed 77 is vibrated to sound the alarm. A tube 80 connects the housing 76 with the suction line 14a to direct the uncondensed refrigerant back into the system.

Figure 5:
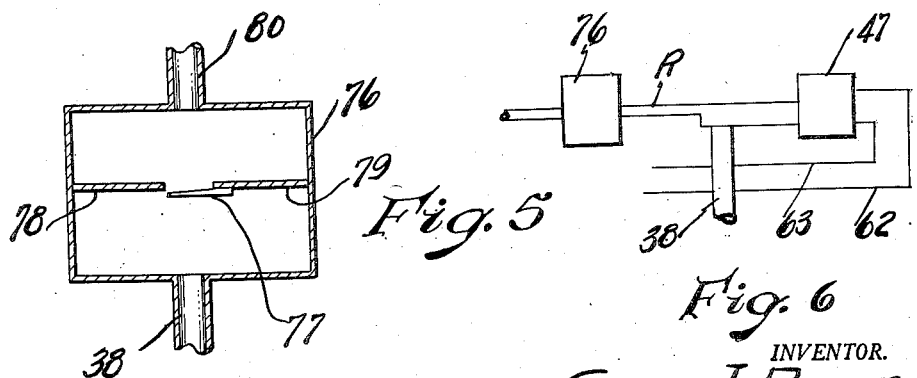
Fig. 5 is a side elevational, sectional view through the audible alarm housing.
Figure 6:
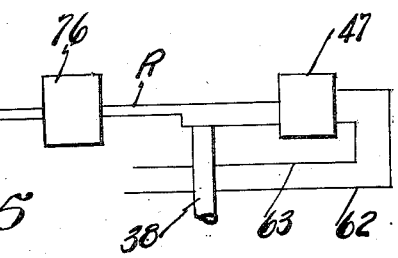
Fig. 6 is a fragmentary view of a further embodiment of the invention in which the vibratory audible alarm is associated with the mechanism shown in Fig. 1.

In Fig. 6 I have indicated still a further embodiment of my invention in which I have placed the audible alarm shown in Fig. 5 in the restrictor tube R of the mechanism depicted in Fig. 1. When the bellows 48 is actuated by high pressure, uncondensed refrigerant to light the lamp 65, the reed 77 in the audible alarm housing 76 is also vibrated to sound the alarm by the gaseous refrigerant flowing into the restrictor tube R.

Figure 7:
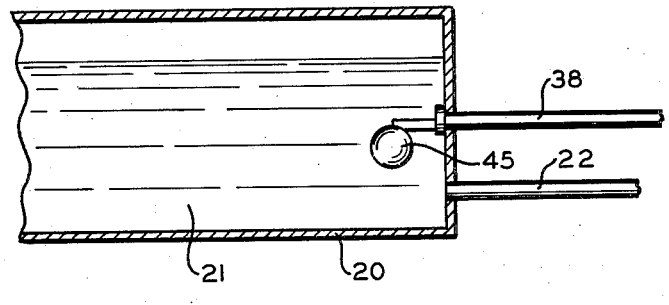
Fig. 7 is a side elevational, sectional view illustrating another embodiment of the same invention.

In Fig. 7 I have illustrated an embodiment of the invention which is identical to that shown in Fig. 1 except that the chamber 23 is omitted and the line 38 leads directly into the receiver chamber 20. The valve 45 is now in the chamber 20 normally blocking the tube 38 as in the previous embodiments. Upon a predetermined drop of the refrigerant in the receiver as before the float drops and the valve 45 is opened to admit uncondensed, high pressure refrigerant which actuates the alarm. In all of the embodiments of the invention it is clear that the float drops upon a predetermined level reduction in the receiver or the liquid line and also in the case of the construction shown in Fig. 1 upon a level reduction in the float chamber 23. By the term liquid line is meant the entire system from the condenser 19 to the evaporators 29 and 35.

It is to be understood that various equivalent changes may be made in the various elements which comprise the invention without departing from the scope of the claims and in all cases the foregoing descriptive text is to be interpreted as merely illustrating the invention rather than as in any way limiting the scope thereof.

The terminology employed is to be given a broad interpretation commensurate with the scope of the invention. For instance the term "normally closed valve means" is to be taken as any means substantially blocking or substantially preventing the high pressure refrigerant or sufficient refrigerant from reaching the alarm under normal conditions to actuate the same. The term "chamber" may refer to a section of the liquid line in which the normally closed valve is disposed or to a tank or receiver in communication with the liquid line.

What is claimed is:

1. An alarm mechanism for refrigerator systems having a receiver in the liquid line to receive condensed refrigerant from a condenser comprising, a float chamber connected to said receiver, flow responsive alarm means communicating with said chamber, and float and valve mechanism in said chamber preventing communication with and actuation of said alarm means except when the float is forced downwardly upon the emptying of liquid from said receiver and the passage of uncondensed refrigerant from said receiver into said float chamber.

2. An alarm mechanism for refrigerator systems having high pressure and low pressure sides and having a receiver in the liquid line to receive condensed refrigerant from a condenser comprising, a liquid filled float chamber connected to said receiver, a conduit leading from said float chamber, float and valve mechanism within said chamber operably associated with said conduit to permit passage of uncondensed refrigerant into said conduit when the float is forced downwardly upon the emptying of liquid from said receiver and the passage of uncondensed refrigerant from said receiver into said float chamber, means communicating with said conduit responsive to the pressure of said uncondensed refrigerant to indicate the abnormal condition, and a restrictor tube connecting said conduit and the low side of said system.

3. A refrigerating apparatus comprising a compressor, a condenser, a receiver, evaporation means, refrigerant lines connecting said compressor and condenser, said condenser and said receiver, said receiver and evaporation means, and said evaporation means and compressor, a float chamber connected to said receiver and normally maintained with a liquid to predetermined level thereby, a conduit leading from said chamber, float and valve means normally closing said conduit but permitting passage of uncondensed refrigerant into said conduit when the float is forced downwardly upon the emptying of liquid from said receiver and said float chamber, and means communicating with said conduit responsive to the pressure of said uncondensed refrigerant to indicate the loss of refrigerant from the apparatus.

4. The combination defined in claim 3 in which said means comprises a pressure operated switch in circuit with an alarm and a power source.

5. The combination defined in claim 3 in which said means comprises a housing and vibratory sound means positioned in said housing in the path of said uncondensed refrigerant.

6. The combination defined in claim 5 in which said sound means comprises a reed and a second conduit connects said housing with the conduit means between said evaporator means and said condenser to return the uncondensed refrigerant to the apparatus.

7. A referigerating apparatus comprising a compressor, a motor for driving said compressor, a circuit connecting said motor with a source of power supply, a condenser, a receiver, evaporation means, refrigerant lines connecting said compressor and condenser, said condenser and receiver, said receiver and evaporation means, and said evaporation means and compressor, a float chamber connected to said receiver, a conduit leading from said chamber, a float and valve means for normally closing said conduit permitting passage of uncondensed refrigerant into said conduit when the float is forced downwardly upon the emptying of liquid from said receiver and the flow of uncondensed refrigerant from said receiver into said float chamber, an alarm circuit connected to said motor supply circuit, an alarm in said circuit and a pressure-operated switch connected in said alarm circuit and responsive to the pressure of uncondensed refrigerant in the conduit to energize said alarm.

8. The combination defined in claim 7 in which a restrictor tube connects the conduit and the refrigerant line connecting the evaporating means and the compressor to permit abnormal pressure variations in said line to operate said switch.

9. The combination defined in claim 7 in which the alarm in said circuit is of relatively low resistance and a second alarm of relatively high resistance is provided in series therewith, the alarm of high resistance being in parallel with said pressure responsive switch and being normally energized.

10. An alarm mechanism for refrigerating apparatus with suction and high pressure lines having a receiver in the high pressure line to receive condensed refrigerant from a condenser comprising, a float chamber connected to said receiver below the normal liquid level therein, a conduit leading from said chamber, float and valve means normally closing said conduit but permitting passage of uncondensed refrigerant into said conduit when the float is forced downwardly upon the emptying of liquid from said receiver and the flow of uncondensed refrigerant from said receiver into said chamber, a bellows operatively communicating with said conduit, a pair of spaced-apart terminals, means on one end of said bellows for contacting one of said terminals upon expansion of said bellows and the other upon contraction of said bellows, an alarm circuit communicating with a power supply and a conduit including said terminals and said means connected to said alarm circuit.

11. An alarm mechanism for refrigerating apparatus with suction and high pressure lines having a receiver in the high pressure line to receive condensed refrigerant from a condenser comprising, a float chamber connected to said receiver below the normal liquid level therein, a conduit leading from said chamber, float and valve means normally closing said conduit but permitting passage of uncondensed refrigerant into said conduit when the float is forced downwardly upon the emptying of liquid from said receiver and the flow of uncondensed refrigerant from said receiver with said chamber, a bellows operatively communicating with said conduit, a pair of spaced-apart terminals, means on one end of said bellows for contacting one of said terminals upon expansion of said bellows and the other upon contraction of said bellows, an alarm circuit including a high resistance alarm and a low resistance alarm in series connected to a power supply, and a circuit including said terminals and said means in parallel with said high resistance alarm.

12. An alarm mechanism for refrigerating apparatus with suction and high pressure lines having a receiver in the high pressure line to receive condensed refrigerant from a condenser comprising, a float chamber connected to said receiver below the normal liquid level therein, a conduit leading from said chamber, float and valve means normally closing said conduit but permitting passage of uncondensed refrigerant into said conduit when the float is forced downwardly upon the emptying of liquid from said receiver and the flow of uncondensed refrigerant from said receiver into said chamber, a bellows operatively communicating with said conduit, a restrictor tube connecting said conduit and the suction line, a pair of spaced-apart terminals, means on one end of said bellows for contacting one of said terminals upon expansion of said bellows and the other terminal upon contraction of said bellows, adjustable spring-loaded members opposing movement of said means toward each terminal, an alarm circuit including a high resistance alarm and a low resistance alarm in series with a power supply, and a circuit including said terminals and said means in parallel with said high resistance alarm.

13. The combination defined in claim 12 in which said means comprises a rod extending from the end of said bellows and a switch arm mounted to pivot between said terminals connected to said rod.

14. A refrigerating apparatus comprising a compressor, a motor for driving said compressor, a circuit connecting said motor with a source of power supply, a condenser, a receiver, evaporation means, refrigerant lines connecting said compressor and condenser, said condenser and receiver, said receiver and evaporation means, and said evaporation means and compressor, a float chamber connected to said receiver, a conduit leading from said chamber, a float and valve means for normally closing said conduit permitting passage of uncondensed refrigerant into said conduit when the float is forced downwardly upon the emptying of liquid from said receiver and the flow of uncondensed refrigerant from said receiver into said float chamber, an alarm circuit connected to said motor supply circuit, an alarm in said circuit, a pressure-operated switch connected in said alarm circuit and responsive to the pressure of uncondensed refrigerant in the conduit to energize said alarm, a restrictor tube connecting the conduit and the refrigerant line connecting the evaporating means and the compressor to permit abnormal pressure variations in said line to operate said switch, and a vibratory alarm means connected in said restrictor tube to sound the alarm upon the passage of high pressure, uncondensed refrigerant thereinto.

15. In combination with a refrigerating apparatus comprising a compressor, a receiver, evaporation means, high pressure refrigerant lines connecting said compressor and condenser, said condenser and receiver, and said receiver and evaporation means, and low pressure lines connecting said evaporation means and compressor, a float chamber interposed in the high pressure line between said receiver and evaporator and normally filled to a predetermined level with liquid from said receiver, a conduit leading out of said chamber at a point below the normal level of said liquid, float and valve means for normally closing said conduit but permitting passage of uncondensed refrigerant into said conduit when the float is forced downwardly upon the emptying of liquid from said float chamber, pressure responsive alarm means in said conduit adapted to be actuated by the flow of the uncondensed refrigerant, and a restrictor tube connecting said conduit and the refrigerant line between the evaporator means and condenser to permit the flow of uncondensed refrigerant back to the system and communicating the low side of the system with said alarm means.

16. A refrigerating apparatus comprising a compressor, a condenser, a receiver, evaporation means, refrigerant lines connecting said compressor and condenser, said condenser and said receiver, said receiver and evaporation means, and said evaporation means and compressor, a float chamber connected to said receiver, and normally maintained with a liquid to predetermined level thereby, a conduit leading from said chamber, float and valve means normally closing said conduit but permitting passage of uncondensed refrigerant into said conduit when the float is forced downwardly upon the emptying of liquid from said receiver and said float chamber, and means communicating with said conduit responsive to the pressure of said uncondensed refrigerant to indicate the loss of refrigerant from the apparatus, and a tube of restricted diameter relative to said conduit connecting said conduit and the refrigerant line between said evaporating means and the condenser.

17. In a refrigeration system having a liquid refrigerant receiver normally containing a supply of liquid refrigerant and a liquid refrigerant line for normally conducting liquid refrigerant from said receiver to other parts of said system, the combination of alarm mechanism responsive to a fall of liquid refrigerant in said receiver below the normal minimum level thereof and flow of uncondensed refrigerant through said line comprising: an alarm device operable in response to the introduction thereto of uncondensed refrigerant; conduit means, formed in part by said line, in communication with said receiver below the level of liquid refrigerant normally contained therein and in communication with said alarm device; normally closed valve means in said conduit means for preventing flow of liquid refrigerant to said alarm device, a fall in the normal supply of liquid refrigerant in said receiver below the normal minimum level thereof resulting in a flow of uncondensed refrigerant through said conduit means; and means responsive to a predetermined flow of uncondensed refrigerant through said conduit means for opening said valve means to permit uncondensed refrigerant to flow through said conduit means to said alarm device.

18. An alarm mechanism for a refrigeration system having a liquid containing chamber in communication with the liquid line comprising, conduit means communicating with the chamber below the normal level of liquid therein; an alarm, operable in response to the introduction thereto of uncondensed refrigerant, in communication with said conduit means and responsive to a flow of uncondensed refrigerant proceeding therethrough; and normally closed valve means, normally preventing flow through said conduit means to said alarm, actuated upon a predetermined drop in the liquid level in the chamber to a level below said conduit means to open and permit uncondensed high pressure refrigerant to reach and actuate said alarm; said system having a high pressure liquid side and a low pressure side, and a restrictor tube of restricted cross-sectional area relative to said conduit means connecting the conduit means with the low side of the system between said valve means and alarm.

19. An alarm mechanism for a refrigeration system having a liquid containing chamber in communication with the liquid line comprising, conduit means communicating with the chamber below the normal level of liquid therein; an alarm, operable in response to the introduction thereto of uncondensed refrigerant, in communication with said conduit means and responsive to a flow of uncondensed refrigerant proceeding therethrough; and normally closed valve means, normally preventing flow through said conduit means to said alarm, actuated upon a predetermined drop in the liquid level in the chamber to a level below said conduit means to open and permit uncondensed high pressure refrigerant to reach and actuate said alarm, said system having a high pressure liquid side and a low pressure side, and conduit means connecting the first conduit means with the low side of the system to return said refrigerant once it has actuated said alarm.

20. In a refrigeration system including; a compressor; evaporation means; a liquid line connecting said compressor and evaporation means and a line returning from said evaporation means to said compressor; a liquid containing chamber communicating with said liquid line between said compressor and evaporation means; conduit means communicating with the chamber; an alarm, operable in response to the introduction thereto of uncondensed refrigerant, in communication with said conduit means and responsive to a flow of uncondensed refrigerant proceeding therethrough; and valve means, normally preventing flow through said conduit which would operate the alarm, actuated upon a predetermined drop in the liquid level in the chamber to open and permit sufficient uncondensed high pressure refrigerant to actuate said alarm to flow into said means and reach said alarm.

21. In a refrigeration system including; a compressor; evaporation means; a liquid line connecting said compressor and evaporation means and a line returning from said evaporation means to said compressor; a liquid containing chamber communicating with said liquid line between said compressor and evaporation means; conduit means communicating with the chamber; an alarm, operable in response to the introduction thereto of uncondensed refrigerant, in communication with said conduit means and responsive to a flow of uncondensed refrigerant proceeding therethrough; valve means normally preventing flow through said conduit which would operate the alarm, actuated upon a predetermined drop in the liquid level in the chamber to open and permit sufficient uncondensed high pressure refrigerant to actuate said alarm to flow into said means and reach said alarm; and conduit means connecting said first mentioned conduit means with the line extending from the evaporation means to the compressor for returning the refrigerant which has actuated the alarm to the system.

22. The combination defined in claim 21 in which said last mentioned conduit means comprises a restrictor tube having a portion of restricted passage relative to said first mentioned conduit means.

23. In a refrigeration system including; a compressor; evaporation means; a liquid line connecting said compressor and evaporation means and a line returning from said evaporation means to said compressor; a liquid containing receiving chamber communicating with said liquid line between said compressor and evaporation means;

conduit means communicating with the chamber below the normal level of liquid therein; an alarm, operable in response to the introduction thereto of uncondensed refrigerant, in communication with said conduit means and responsive to a flow of uncondensed refrigerant proceeding therethrough; and valve means, normally preventing flow through said conduit means to said alarm, actuated upon a predetermined drop in the liquid level in the chamber to open and permit uncondensed high pressure refrigerant to reach and actuate said alarm.

References Cited in the file of this patent

UNITED STATES PATENTS

| | | | |
|---|---|---|---|
| Re. 19,700 | Williams | Sept. 10, | 1935 |
| 173,395 | Dechamp | Feb. 15, | 1876 |
| 1,944,899 | Miller | Jan. 30, | 1934 |
| 2,082,035 | Smith | June 1, | 1937 |
| 2,195,990 | Liegard | Apr. 2, | 1940 |
| 2,439,331 | Beam | Apr. 6, | 1948 |
| 2,475,069 | Wood | July 5, | 1949 |
| 2,739,576 | Ricardo | Mar. 27, | 1956 |